(12) United States Patent
Hughes et al.

(10) Patent No.: US 7,257,712 B2
(45) Date of Patent: Aug. 14, 2007

(54) RUNTIME DIGITAL SIGNATURES

(75) Inventors: Aidan T. Hughes, Bellevue, WA (US); Joel Downer, Redmond, WA (US); Raymond Fowkes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 736 days.

(21) Appl. No.: 10/449,285

(22) Filed: May 30, 2003

(65) Prior Publication Data

US 2004/0243807 A1    Dec. 2, 2004

(51) Int. Cl.
*H04L 9/00* (2006.01)
(52) U.S. Cl. .................. 713/176; 713/180
(58) Field of Classification Search .......... 713/170, 713/176, 180–181, 189; 726/30
See application file for complete search history.

(56) References Cited

U.S. PATENT DOCUMENTS 5,907,619 A * 5/1999 Davis .................. 713/176
6,704,871 B1* 3/2004 Kaplan et al. ........... 713/192

OTHER PUBLICATIONS

Fegghi, J. et al., "Digital Certificates—Applied Internet Security", Addison Wesley Press, Oct. 15, 1998, pp. 27-199.
Schneier, B., "Applied Cryptography: Protocols, Algorithms, and Source Code in C", Published by John Wiley & Sons, Inc., 1996, entire book (758 pgs.).

* cited by examiner

*Primary Examiner*—Hosuk Song
(74) *Attorney, Agent, or Firm*—Merchant & Gould P.C.; Ryan T. Grace

(57) ABSTRACT

Systems and methods for providing incremental verification of the authenticity of a document for a given computer system are disclosed.

15 Claims, 11 Drawing Sheets

RUNTIME DIGITAL SIGNATURES

FIELD OF THE INVENTION

The present invention relates to systems and methods for providing incremental verification of the authenticity of a computer file for use on a computer system.

BACKGROUND OF THE INVENTION

Digital signatures have been used for years to provide one or more of the following benefits: (1) to enable software publishers to certify that a file has been tested and approved for release; (2) to enable the integrity of a file to be verified by an end user; and (3) to enable the identity of the software publisher to be verified using a trust model between the software publisher and an end user. Digital signatures are typically based on a combination of two technologies, namely, cryptographic hashing and public key cryptography. An exemplary method of digitally signing a file is shown in FIG. 1.

As shown in FIG. 1, process 10 for digitally signing a file m begins by performing a hash function on the contents of file m. File m, designated block 11 in FIG. 1, is passed through a hash function designated as block 12 to generate a hash function output h as shown as block 13. Hash function output h is encrypted using a private key (PrK) designated as block 14. To accomplish this, a public key encryption function is performed on hash function output h using the private key (PrK) at block 15. Encryption function output s (shown in block 16) is attached to original file m to form digitally signed file $m_{ds}$ designated as block 17.

Digitally signed file $m_{ds}$ may be verified according to a process as shown in FIG. 2. As shown in FIG. 2, digitally signed file $m_{ds}$, designated as block 17, comprising original file m and encryption function output s is subjected to a verification process 20 comprising the following steps. Component s, designated as block 16 within digitally signed file $m_{ds}$ designated as block 17, is subjected to a public key decryption function using the public key PK shown in block 21. The public key decryption function decrypts component s in block 22 resulting in output $h_1$ as shown in block 23. A hash function is performed on the entire contents of file m as shown in block 24 resulting in a hash function output h as shown in block 25. Hash function output h is compared with public key decryption function output $h_1$ at decision block 26. If hash function output h matches public key decryption function output $h_1$, a valid signature is determined as shown in block 27. If hash function output h does not match public key decryption function output $h_1$, an error is detected as shown in block 28.

In order for the above verification process to be completed, the entire contents of digitally signed file $m_{ds}$, designated as block 17, which includes original file m designated as block 11 and encryption component s designated as block 16, must be loaded by a user's computer prior to the verification process. For large files, the need to load the entire digitally signed file results in undesirable performance features. Such undesirable performance features include, but are not limited to, excessive application boot time, loading of code and data that is not required to enable running of the application, unnecessary use of system memory due to loading of unused code and data (i.e., code and data that are not required to enable running of an application).

Efforts continue to provide the security of digitally signed files, while attempting to minimize application boot time, increase customer satisfaction, and maintain product quality.

Accordingly, there remains a need for improved technology solutions relating to the use of digital signatures and the process of verifying digital signatures.

SUMMARY OF THE INVENTION

The present invention addresses some of the difficulties and problems discussed above by the discovery of a new digital signature and a method of using the digital signature to authenticate the contents and source of a file for use on a computer system. The digital signature, referred to herein as a "Runtime Digital Signature" (RDS), and the method of the present invention enable incremental verification of a file as the file is loaded onto a computer. Consequently, the entire contents of a file does not need to be loaded, but instead, only portions (i.e., pages) of the file necessary to perform a given application session are loaded. The "Runtime Digital Signature" (RDS) and method of the present invention provides a system for verifying the authenticity of a file, while minimizing application boot time or document load time.

Accordingly, the present invention is directed to a Runtime Digital Signature (RDS) comprising an encrypted output, wherein at least one component used to produce the encrypted output comprises a hash function output of a page hash table. In one exemplary embodiment of the present invention, the Runtime Digital Signature (RDS) may further comprise an encrypted output, wherein at least the following components are used to produce the encrypted output: (1) a hash function output of a page hash table, and (2) a file hash function output of the entire contents of a file.

The present invention is also directed to a runtime digitally signed file comprising a file combined with a runtime digital signature. The runtime digitally signed file may be used to protect the security and authenticity of the file, as well as, verify the source of the file. In one exemplary embodiment of the present invention, the runtime digitally signed file comprises the contents of an executable file combined with a runtime digital signature generated for the executable file using a page hash table of the executable file.

The present invention is further directed to a method of generating a Runtime Digital Signature (RDS). In one exemplary embodiment of the present invention, the method of generating a runtime digital signature comprises: performing a first hash function on each page of a file to generate x first hash results, wherein x represents the number of pages of the file; forming a page hash table from the x first hash results; performing a second hash function on the page hash table to generate page hash table hash result j; and performing an encryption function on j. In a further exemplary embodiment of the present invention, the method of generating a runtime digital signature further comprises: performing a third hash function on the entire file contents of the file to generate file hash result h; and performing an encryption function on j and h.

The present invention is also directed to a method of verifying the authenticity of a digitally signed file comprising the Runtime Digital Signature (RDS). In one exemplary embodiment of the present invention, the method of verifying the authenticity of a runtime digitally signed file com prises: loading a page hash table associated with the runtime digitally signed file; verifying the integrity of the page hash table; loading one or more pages of the runtime digitally signed file; and verifying the integrity of each page as each page is loaded.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to a Runtime Digital Signature (RDS). In one exemplary embodiment of the present invention, the Runtime Digital Signature (RDS) comprises an encrypted output, wherein at least one component used to produce the encrypted output comprises a hash function output of a page hash table. The present invention is also directed to a method of generating a Runtime Digital Signature (RDS) and a digitally signed document or file using the Runtime Digital Signature (RDS).

The present invention is further directed to a method of providing incremental verification of the authenticity of a document digitally signed with the Runtime Digital Signature (RDS).

The Runtime Digital Signature (RDS) may be used to secure documents from unwanted alteration. Further, the Runtime Digital Signature (RDS) may be used to substantially guarantee the authenticity of the document and the source of the document. Digitally signed documents using the Runtime Digital Signature (RDS) may be loaded and executed on a variety of computer systems comprising a variety of hardware components. An exemplary computer system and exemplary operating environment for practicing the present invention is described below.

Exemplary Operating Environment

Figure 3:
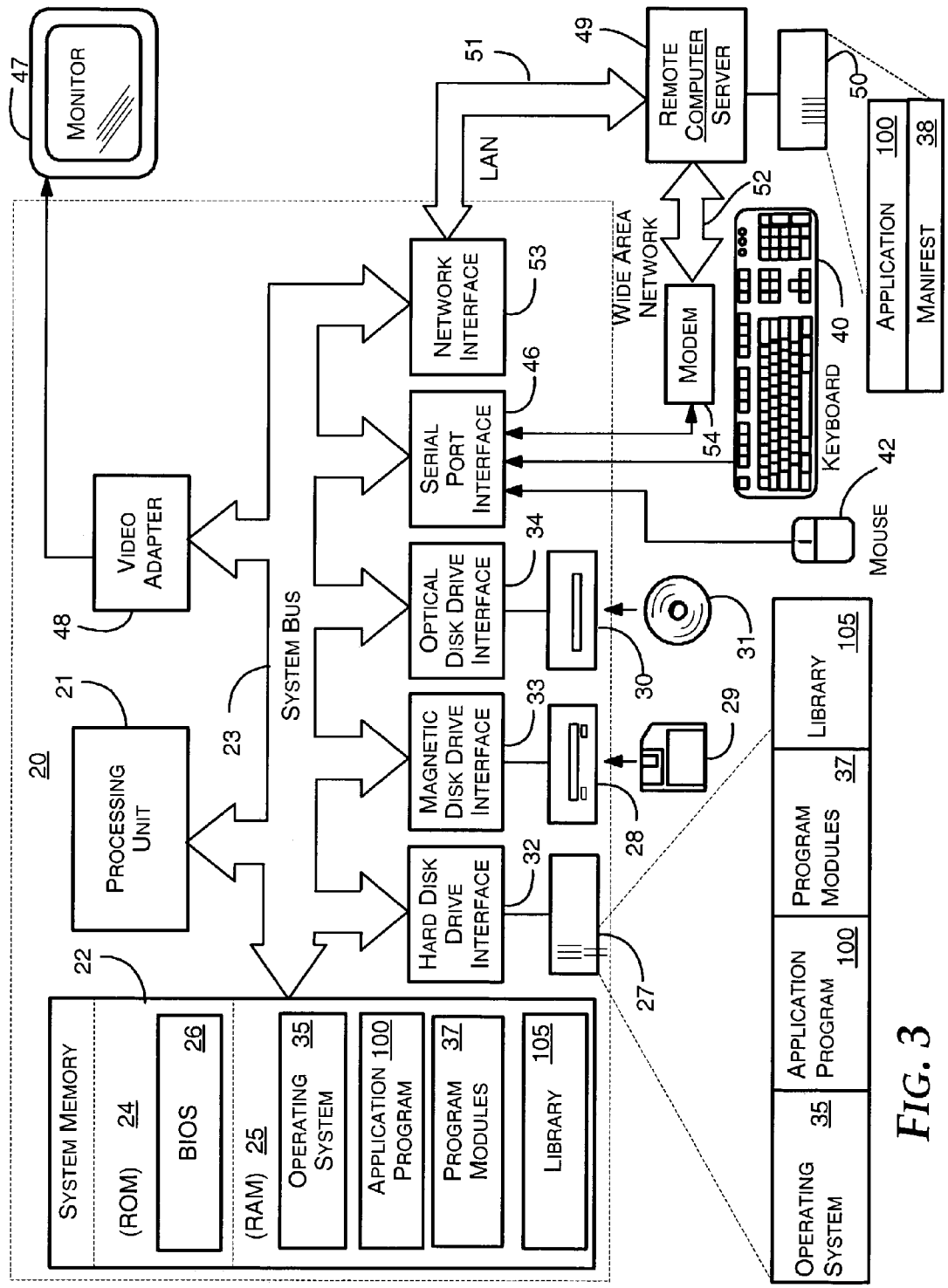
FIG. 3 is a flow diagram of some of the primary components of an exemplary operating environment for implementation of the present invention.

Exemplary embodiments of the present invention will hereinafter be described with reference to the drawings, in which like numerals represent like elements throughout the several figures. FIG. 3 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media, which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, one or more data files 60 (not shown) may be stored in the RAM 25 and/or hard drive 27 of the personal computer 20.

A number of program modules may be stored on hard disk 27, magnetic disk 29, optical disk 31, ROM 24, or RAM 25, including an operating system 35, an application program module 36, other program modules 37, and program data 38. Program modules include, but are not limited to, routines, sub-routines, programs, objects, components, data structures, etc., which perform particular tasks or implement particular abstract data types. Aspects of the present invention may be implemented as an integral part of an application program 100 or as a part of another program module 37.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A monitor 47 or other type of display device may also be connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to personal computer 20, only a memory storage device 50 has been illustrated in FIG. 3. The logical connections depicted in FIG. 3 include a local area network (LAN) 51 and a wide area network (WAN) 52. Such networking environments are commonplace in offices, enterprise-wide computer networks, intranets, and the Internet.

When used in a LAN networking environment, personal computer 20 is connected to local area network 51 through a network interface or adapter 53. When used in a WAN networking environment, personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multiprocessor systems, microprocessor based or programmable consumer electronics, networked personal computers, minicomputers, mainframe computers, and the like. The present invention may also be practiced in distributed computing environments, where tasks are performed by remote processing devices that are linked through a communications network. In a distributed computing environment, program modules may be located in both local and remote memory storage devices.

Implementation of Exemplary Embodiments of the Present Invention

The present invention is directed to a runtime digital signature (RDS), a runtime digitally signed file comprising a runtime digital signature, a method of generating a runtime digital signature, a method of verifying the authenticity of a file, which has been digitally signed with a runtime digital signature, and various uses for a runtime digital signature.

An exemplary method of the present invention for generating a runtime digital signature (RDS) is given below. Further, an exemplary method of the present invention for verifying the authenticity of a file, which has been digitally signed using a runtime digital signature is also described below.

Generating a Runtime Digital Signature

A description of an exemplary method of generating a runtime digital signature (RDS) is given below. The method of generating a runtime digital signature may comprise one or more of the following steps: (1) dividing a file into two or more portions or pages; (2) performing a hash function on each portion or page of the file to generate page hash results; (3) forming a page hash table (PHT) from the page hash results; (4) performing a hash function on the entire file contents to generate a file hash result; (5) performing a hash function on the page hash table (PHT) contents to generate a page hash table hash result; (6) performing an encryption function using one or more of the following: (i) the page hash table hash result, (ii) the file hash result, and (iii) a private key known only to an entity such as a software publisher to generate a runtime digital signature. The runtime digital signature may then be combined with the file to form a runtime digitally signed file. Each of the possible method steps are described below.

A. Dividing a File Into Portions or Pages

One step in the method of generating a runtime digital signature (RDS) may comprise dividing a given file, such as exemplary file m, into two or more portions or pages. Typically, the number of portions or pages, herein referred to as x, depends on the overall size of file m. In one embodiment of the present invention, each portion or page of file m may have a size matching that of the operating system's program loader. For an application such as Microsoft's Windows® application, a desirable page size ranges from about 2 kilobytes to about 8 kilobytes, more desirably from about 3 kilobytes to about 5 kilobytes, and even more desirably 4 kilobytes. For an application such as Microsoft's Excel® application, the page size may be the same as above or some other desired page size. In other embodiments of the present invention, each portion or page of file m may have a size suitable for incremental verification of data transmitted over low bandwidth media, ranging from about 16 kilobytes to about 256 kilobytes, more desirably 32 kilobytes to 128 kilobytes, and even more desirably 64 kilobytes.

Figure 4:
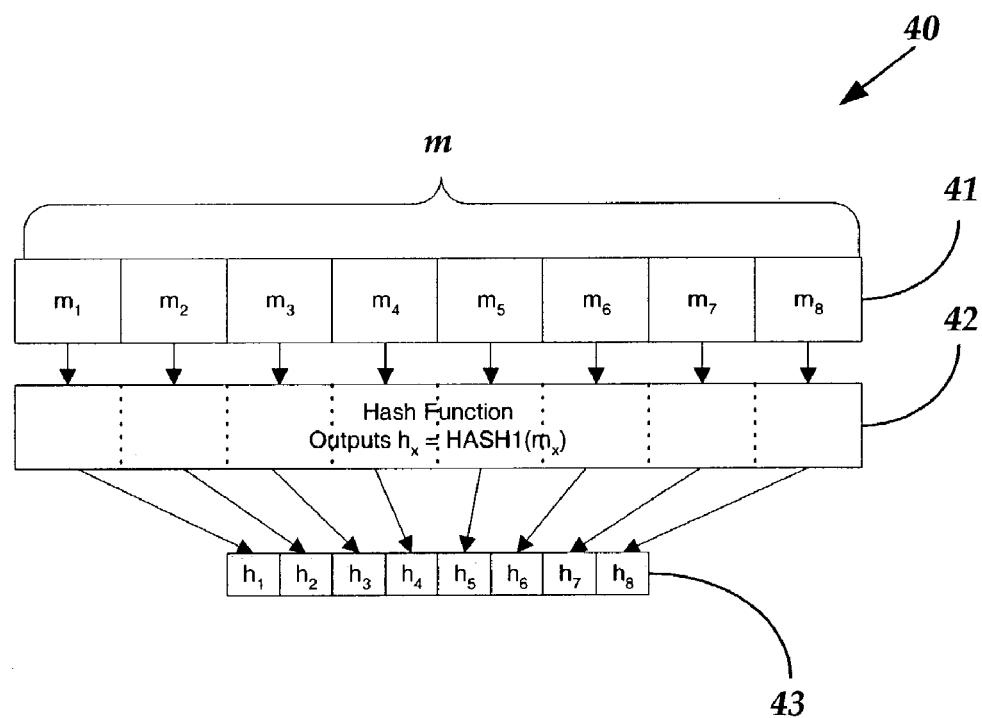
FIG. 4 depicts exemplary steps in a method of generating a runtime digital signature, including steps for forming a page hash table of the present invention.

In one exemplary embodiment of the present invention shown in FIG. 4, file m is divided into eight pages (i.e., x=8) represented by symbols $m_1$ to $m_8$ within block 41.

B. Performing A Hash Function on Each of the File Pages

The method of generating a runtime digital signature (RDS) may also comprise a step of performing a hash function on each page of file m. As shown in FIG. 4, a hash function, $h_x=HASH1(m_x)$, designated as block 42, may be performed on pages $m_1$ through $m_8$. Any known hash function may be used in the present invention as long as the hash function is capable of accepting a file page content or entire file of arbitrary length and producing a hash output or result having a fixed length of less than about 320 bits. Examples of suitable hash functions include, but are not limited to, hash function algorithms HAVAL, MD2, MD4, MD5, and SHA-1, all of which are known to those of ordinary skill in the art. Suitable exemplary hash functions and a description thereof may be found in *Applied Cryp-*

*tography* by Bruce Schneier, published by John Wiley and Sons (ISBN# 0471117099), the disclosure of which is incorporated herein in its entirety.

In one embodiment of the present invention, each page hash output, designated $h_1$ to $h_8$ in FIG. 4, has a length of up to about 320 bits. Desirably, each separate page hash result has a length of from about 32 to about 256 bits, more desirably, about 160 bits.

C. Forming a Page Hash Table

As shown in FIG. 4, a page hash table 43 may be formed from one or more of the individual page hash results. Desirably, page hash table 43 comprises a concatenated string of page hash results. Exemplary page hash table 43 shown in FIG. 4 comprises a concatenated string of hash values $h_1$ to $h_8$. Page hash table 43 has a length, which varies depending on a number of factors including, but not limited to, the number of pages of a given file m, the number of page hash results used to form the page hash table, and the length of each page hash result. The total length of page hash table is desirably equal to the number of pages x times a desired page hash result length for each page hash result. In one exemplary embodiment, the resulting page hash table 43 as shown in FIG. 4 might have a desired total length of about 1,280 bits (i.e., 8 times 160 equals 1,280).

D. Performing A Hash Function on File Contents

Figure 5:
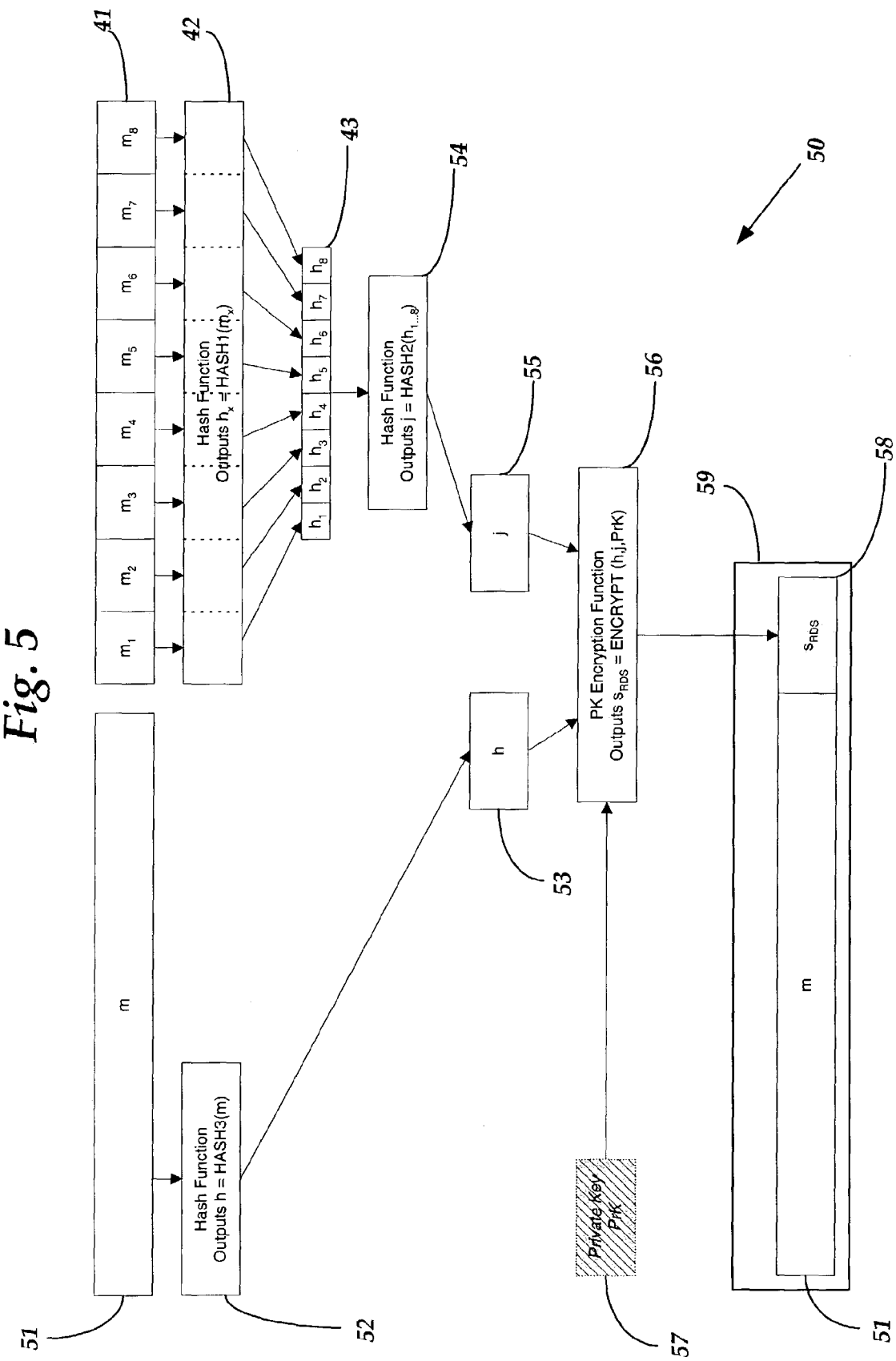
FIG. 5 depicts exemplary steps in a method of generating a runtime digital signature and runtime digitally signed file of the present invention.

The method of generating a run time digital signature (RDS) may also comprise a step of performing a hash function on the entire contents of a file, such as exemplary file m shown in FIG. 5. File m, designated as block 51 in FIG. 5, may be subjected to a hash function as depicted in block 52. The hash function, h=HASH3(m), may be any of the above described hash functions. The file hash result h, shown as block 53 in FIG. 5, may have a desired length as described above. Desirably, file hash result h has a length of from about 32 to about 256 bits, more desirably, about 160 bits.

E. Performing A Hash Function on A Page Hash Table

Another possible step in the method of generating a runtime digital signature (RDS) is the step of performing a hash function on page hash table (PHT) 43. As shown in FIG. 5, a hash function, j=HASH2($h_1 \ldots _8$), designated as block 54 in FIG. 5, results in hash output j designated block 55 in FIG. 5. The hash function used to produce page hash table (PHT) hash result j may be any known hash function as described above. Typically, the hash function used to produce page hash table (PHT) hash result j is identical to the hash function used to produce page hash table hash results $h_1$-$h_8$, though different hash functions may be used if so desired.

F. Performing an Encryption Step to Generate A Runtime Digital Signature

The method of generating a runtime digital signature may further comprise at least one encryption step, wherein one or more pieces of data are encrypted to provide a runtime digital signature (RDS). One exemplary encryption step is shown in FIG. 5. As shown in FIG. 5, an encryption step, designated as block 56 in FIG. 5, is performed on the following pieces of data: (i) file hash result h, and (ii) page hash table hash result j, using a private key 57, wherein the private key is known only to a party generating the runtime digital signature, such as a software distributor. A public key encryption function is used in block 56 to produce encryption function output $s_{RDS}$, the runtime digital signature (RDS).

Any known public key encryption function may be used in the present invention as long as the encryption function is capable of accepting one or more strings of data of arbitrary length and a private key and producing an encrypted output or result verifiable using the corresponding public key. Examples of suitable encryption functions include, but are not limited to, encryption functions RSA and DSS. Suitable encryption functions and a description thereof may be found in *Applied Cryptography* by Bruce Schneier, published by John Wiley and Sons (ISBN# 0471117099), the disclosure of which is incorporated herein in its entirety.

It should be noted that the encryption step used to produce the runtime digital signature of the present invention may involve performing an encryption function on only the page hash table hash result j using private key 57. Further, one or more other pieces of data may be used to provide output $s_{RDS}$ designated as 58 in FIG. 5.

G. Forming a Runtime Digitally Signed File

Figure 1:
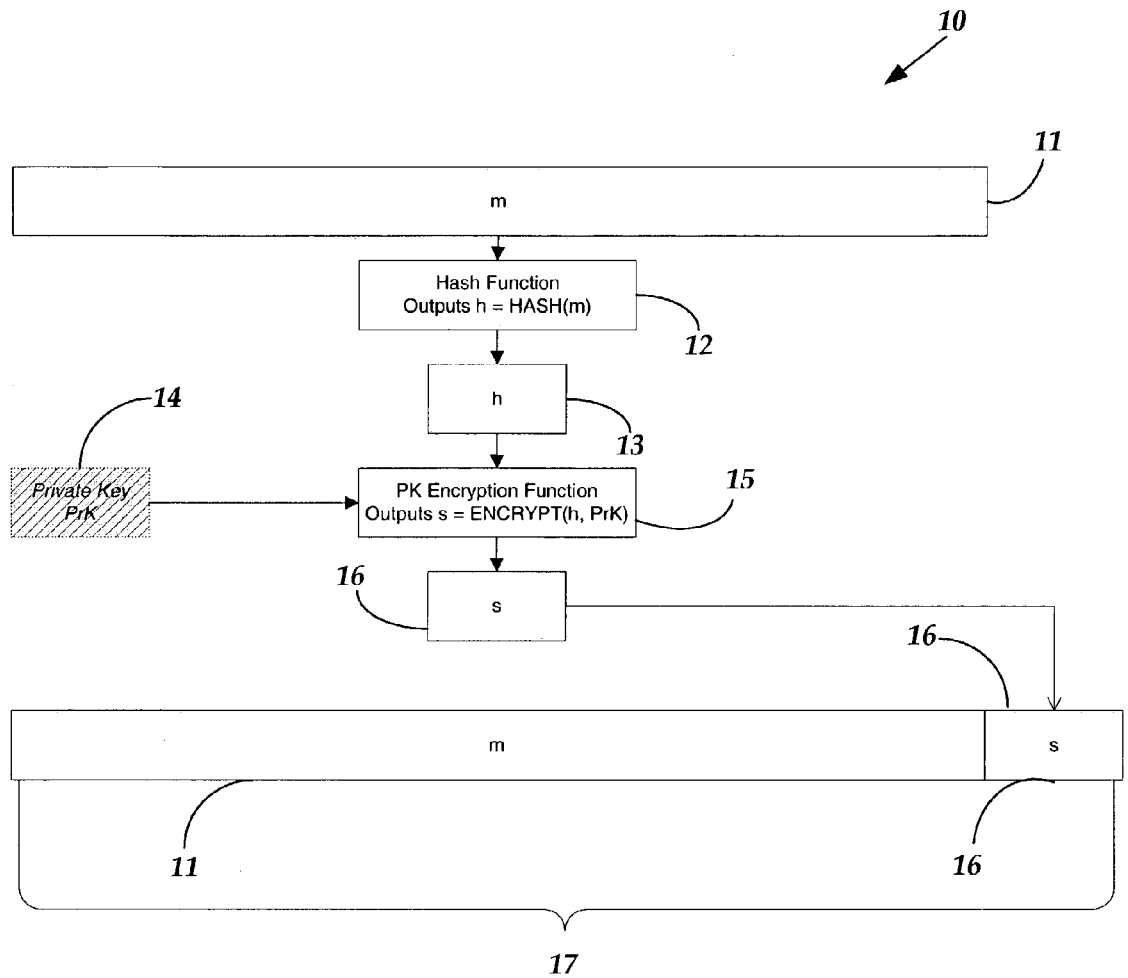
FIG. 1 depicts an exemplary method of digitally signing a file prior to the present invention.
Figure 2:
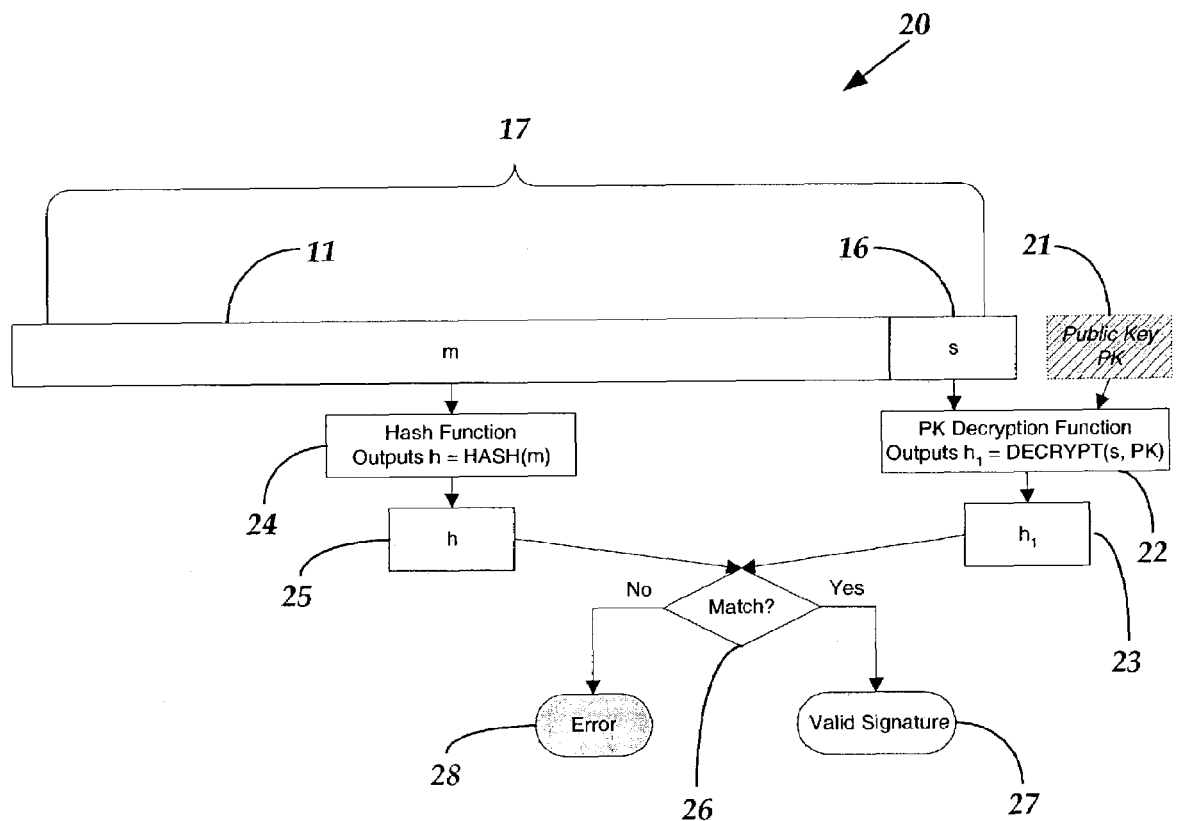
FIG. 2 depicts an exemplary method of verifying the authenticity of a digitally signed file prior to the present invention.

As shown in FIG. 5, encryption function output $s_{RDS}$, designated as block 58, is combined with original file m, designated as block 51, to form runtime digitally signed file $m_{RDS}$, designated by block 59. Encryption function output $s_{RDS}$ is combined with original file m in a manner similar to how a classic digital signature is combined with a file as shown in FIG. 1.

II. Verifying the Authenticity of a Runtime Digitally Signed File

The present invention is also directed to a method of verifying the authenticity of a runtime digitally signed file. The method of verifying the authenticity of a runtime digitally signed file may comprise one or more of the following steps: loading a page hash table (PHT) associated with the runtime digitally signed file, referred to herein as exemplary file $m_{RDS}$; verifying the integrity of the page hash table (PHT); loading one or more pages of runtime digitally signed file $m_{RDS}$; and verifying the integrity of each page of runtime digitally signed file $m_{RDS}$ as each page is loaded. A description of each of the method steps is given below.

A. Loading the Page Hash Table

The method of verifying the authenticity of a runtime digitally signed file desirably comprises a step of verifying the integrity of a page hash table (PHT) associated with the runtime digitally signed file $m_{RDS}$. In order to verify the integrity of the page hash table, the page hash table is loaded onto a user's computer. Typically, the page hash table is either provided to a user within a file separate from the runtime digitally signed file $m_{RDS}$, or created on initial install or first use of the file on the user's computer via the process depicted in FIG. 4, then stored for future re-use.

B. Verifying the Integrity of A Page Hash Table

Figure 6:
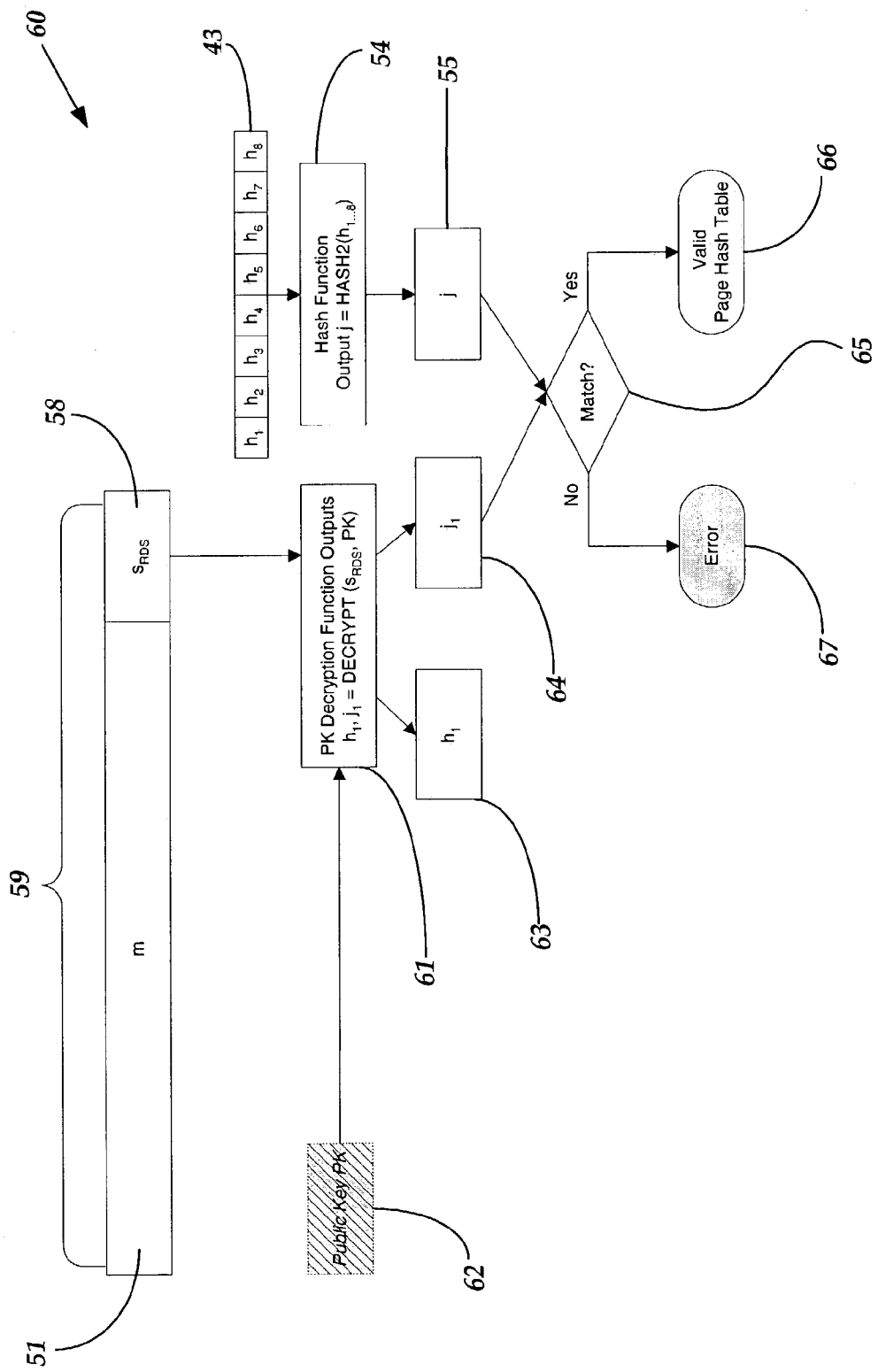
FIG. 6 depicts an exemplary method of verifying the authenticity of a page hash table of the present invention.

The method of verifying the integrity of a page hash table (PHT) may be performed as shown in FIG. 6. Page hash table verification process 60 comprises performing a hash function, designated as block 54, on page hash table, designated as block 43 in FIG. 6, in order to produce hash function output j, designated by block 55. Verification process 60 also comprises a public key decryption function, designated as block 61 in FIG. 6, in order to decrypt runtime digital signature $s_{RDS}$, designated as block 58. Public key decryption function contained in block 61 uses a public key, designated as block 61, in order to produce decryption function outputs $h_1$ and $j_1$, designated by blocks 63 and 64 respectively in FIG. 6.

A comparison is made between decryption function output $j_1$ within block 64 and page hash table hash output j depicted in block 55. A determination is made at decision block 65 as to whether decryption function output $j_1$ matches page hash table hash output j. If decryption function output $j_1$ matches page hash table hash output j at decision block 65, verification of a valid page hash table is made as shown in block 66. If decryption function output $j_1$ and page hash table hash output j do not match in decision block 65, an error results as shown in block 67.

If the page hash table verification process 60 results in the verification of a valid page hash table as shown in block 66, the method of verifying the authenticity of run time digitally signed file proceeds to a page-loading step.

C. Loading Pages of A Runtime Digitally Signed File

Figure 7:
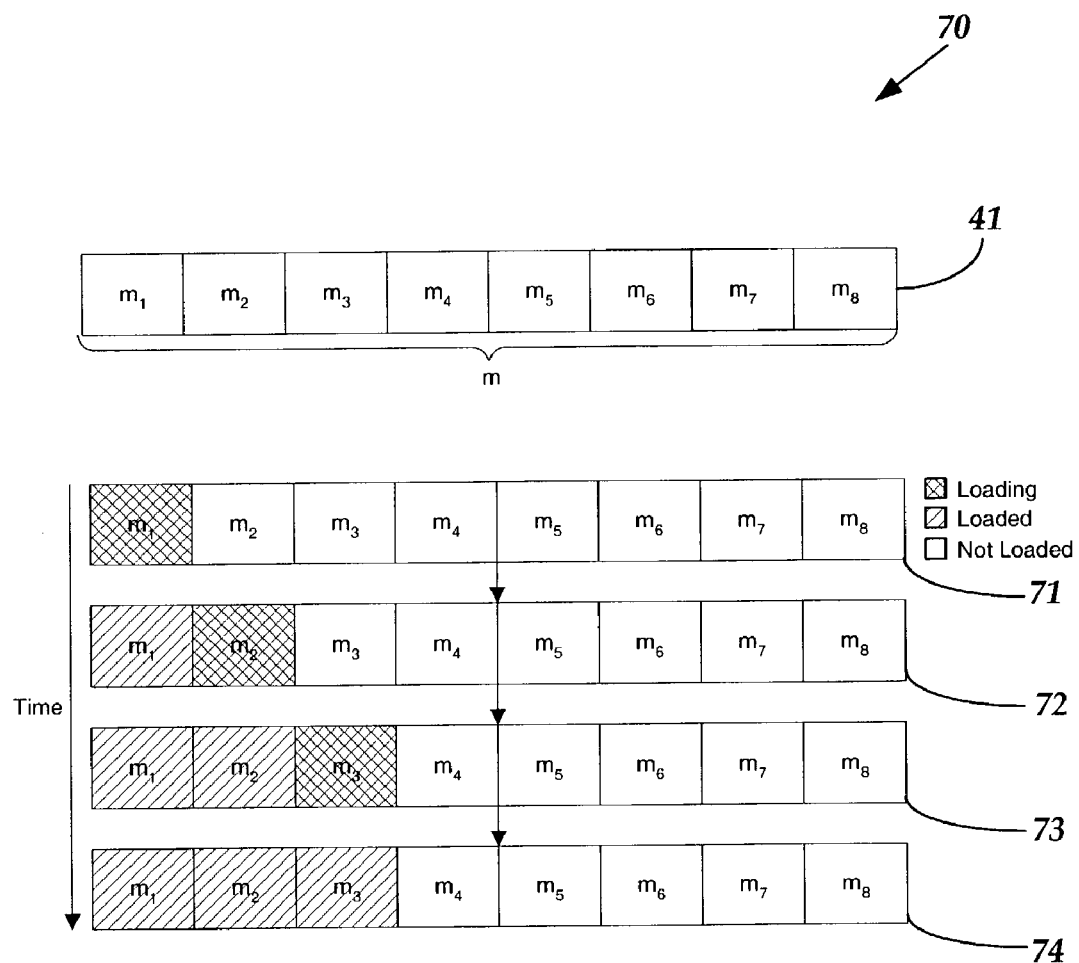
FIG. 7 depicts an exemplary method of loading pages of a file.

As shown in FIG. 7, page-loading process 70 comprises a loading process wherein a single page, $m_x$ of exemplary file m is loaded at a time. Exemplary file m comprises eight pages, $m_1$-$m_8$, all of which are shown within block 41. Blocks 71 through 74 of FIG. 7 depict a page-loading process as a function of time. As indicated in block 71, first page $m_1$ is being loaded at time $t_1$, while pages $m_2$-$m_8$ are in a "not loaded" state. As shown in block 72, page $m_2$ is in the process of being loaded at time $t_2$. Further, at line 72, page $m_1$ has already been loaded, while pages $m_3$-$m_8$ remain in a "not loaded" state. In block 73, at time $t_3$, pages $m_1$ and $m_2$ are loaded, page $m_3$ is in the process of being loaded, and pages $m_4$-$m_8$ remain in a "not loaded" state. Block 74 depicts page-loading process 70 at $t_4$ wherein pages $m_1$-$m_3$ are loaded, pages $m_4$-$m_8$ remain in a "not loaded" state, and the page-loading process pauses or stops.

As explained in more detail below, all of the pages of a file may not need to be loaded in order to boot a given application and/or complete an application session. The loading process as depicted in FIG. 7 may represent such a situation, wherein pages $m_1$-$m_3$ are required to boot application file m and/or complete an application session involving file m, while pages $m_4$-$m_8$ are not needed during the application session.

D. Verifying the Integrity of Each Page of A Runtime Digitally Signed File

Figure 8:
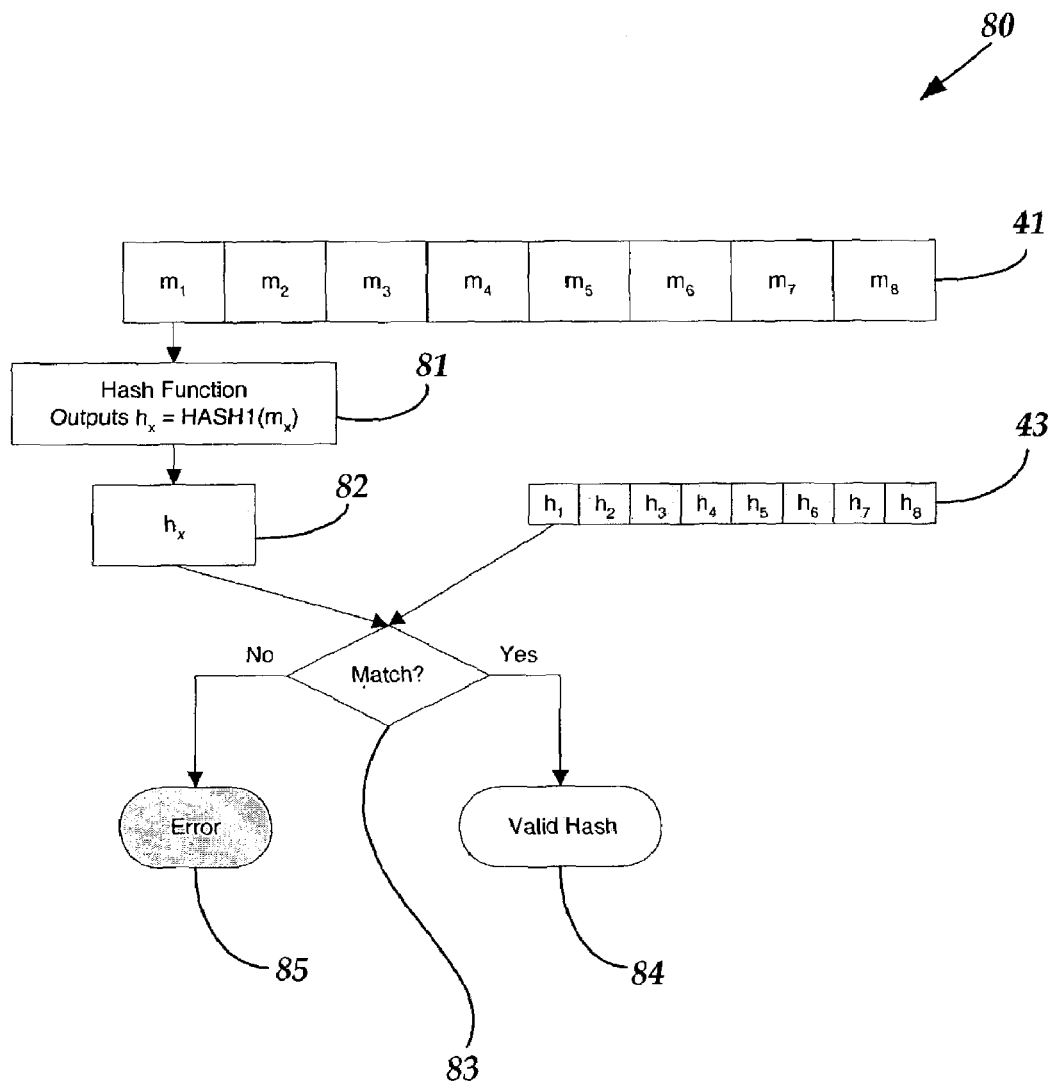
FIG. 8 depicts an exemplary method of incrementally verifying the authenticity of a runtime digitally signed file of the present invention by verifying each page as the page is loaded.

As each page of file $m_{RDS}$ is loaded, a page integrity verification process is performed on each page during the loading process. An exemplary page verification process 80 is shown in FIG. 8. Page verification process 80 comprises performing a hash function, designated as block 81, on each page $m_x$ as each page $m_x$ is loaded from file $m_{RDS}$. As shown in FIG. 8, page $m_1$ within block 41 is subjected to page hash function $h_x$, wherein $h_x$=HASH1($m_x$), to produce page hash result $h_x$ as shown in block 82. Each page hash result, $h_x$, is compared to the corresponding hash value, $h_1 \ldots h_8$, within page hash table 43. A determination is made at decision block 83 as to whether page hash result $h_x$ as shown in block 82 matches $h_1$ from page hash table 43. If $h_x$ matches the corresponding page hash result within page hash table 43, the integrity of a given page is verified as shown by the "valid has h" block 84. In this case, page one, designated $m_1$ of file $m_{RDS}$, would be loaded as a valid page from file $m_{RDS}$. If a determination is made at decision block 83 that $h_x$ does not match the corresponding page hash result within page hash table 43 at decision block 83, an error results as indicated in block 85. In this case, the given page of file $m_{RDS}$ would not be loaded.

III. Using A Runtime Digital Signature to Enable the Secure Use of A Software Product on A Computer System The present invention is further directed to a method of using a runtime digital signature (RDS) and a runtime digitally signed file to enable the secure use of a software product on a computer system. In one embodiment of the present invention, the method of using a runtime digital signature (RDS) and a runtime digitally signed file to enable the use of a software product on a computer system is initiated (i) during initial installation of the software product onto a computer, (ii) during launching of a software product or application already existing on a component of a computer hardware configuration, or (iii) both. An exemplary method for using the runtime digital signature (RDS) of the present invention is described in FIGS. 9-10. The steps of the exemplary method may be performed by software code within a software product on a customer's computer, similar to computer 20 described above with reference to FIG. 1.

A. Producing A Runtime Digitally Signed Software Product

Figure 9:
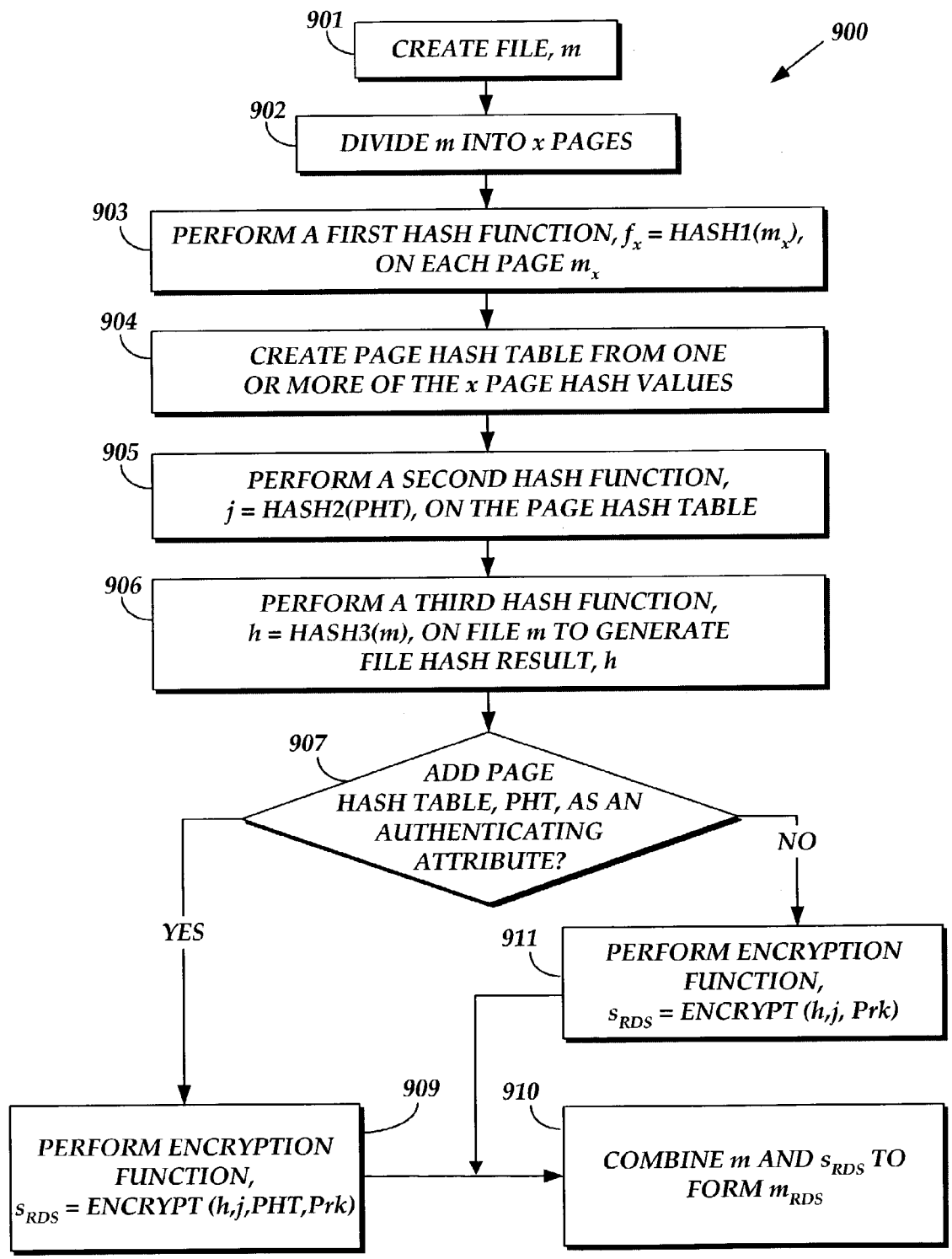
FIG. 9 is a flow diagram showing exemplary steps in a method of generating a runtime digital signature and runtime digitally signed file of the present invention.

As shown in FIG. 9, process 900 begins with step 901, wherein an exemplary file m is created. In step 902, file m is divided into x pages. As discussed above, the number of pages and the length of each page may vary depending on a number of factors including, but not limited to, the size of file $m_x$ the file type (i.e., a Microsoft Windows® application file, a Microsoft Excel® file, etc.) and the scenario to which the technology is being applied (i.e., runtime verification of application code and data, incremental verification of transmitted data, etc.).

Step 902 proceeds to step 903, wherein a first hash function, HASH1($m_x$), is performed on each page $m_x$ within file m to produce a page hash value $f_x$. In step 904, a page hash table is created from one or more of the x page hash values (i.e., $f_x$) obtained in step 903. Desirably, the page hash table comprises a concatenated string of page hash values $f_1$ to $f_x$. In step 905, a second hash function, j=HASH2(PHT), is performed on the page hash table created in step 904. Step 905 proceeds to step 906, wherein a third hash function, h=HASH3(m), is performed on the file contents of file m to generate a file hash result, h.

As shown in FIG. 9, at decision block 907, a determination is made as to whether the page hash table (represented by PHT) is to be added to the runtime digital signature as an authenticated attribute. If the page hash table PHT is added to the runtime digital signature as an authenticated attribute, process 900 proceeds to step 909, wherein a public key encryption function, $s_{RDS}$=ENCRYPT(h,j,PHT,Prk), is performed on file hash result h, page hash table hash result j, and page hash table PHT, using a private key (Prk) to form a runtime digital signature, $s_{RDS}$. Step 909 proceeds to step 910, wherein the contents of file m are combined with runtime digital signature $s_{RDS}$ to form a runtime digitally signed file $m_{RDS}$.

Returning to decision block 907, if a determination is made not to include page hash table PHT as an authenticated attribute of the runtime digital signature, process 900 proceeds to step 911, wherein an encryption function, $s_{RDS}$=ENCRYPT (h,j,Prk), is performed on file hash result h, page hash table hash result j, and a private key (Prk). Step 911 proceeds to step 910, wherein the contents of file m and the runtime digital signature $s_{RDS}$ of step 911 are combined to form a runtime digitally signed file $m_{RDS}$.

Exemplary process 900 described above in FIG. 9 may be used by a software developer and/or distributor to create a runtime digitally signed software product. Once the runtime digitally signed product is available for distribution, the software provider may distribute the product to an end user via a computer readable medium including, but not limited to, a floppy disk, a CD, and the Internet. Typically, a customer purchases a software product that can run on a given computer, such as computer 20 shown in FIG. 1. The software product may be a shrink-wrap product having a software program stored on a transportable computer-readable medium, such as a CD-ROM or floppy diskette. Alternatively, the software product may be delivered electronically over a network, such as a local area network (LAN) 51 or a wide area network (WAN) 52. The customer initiates a loading process to load the software product onto the computer 20 as a program stored in system memory 22. The end user may verify the authenticity of the software product using an exemplary method described below in FIGS. 10A-10B.

B. Verifying the Authenticity of A Runtime Digitally Signed Software Product

Figure 10A:
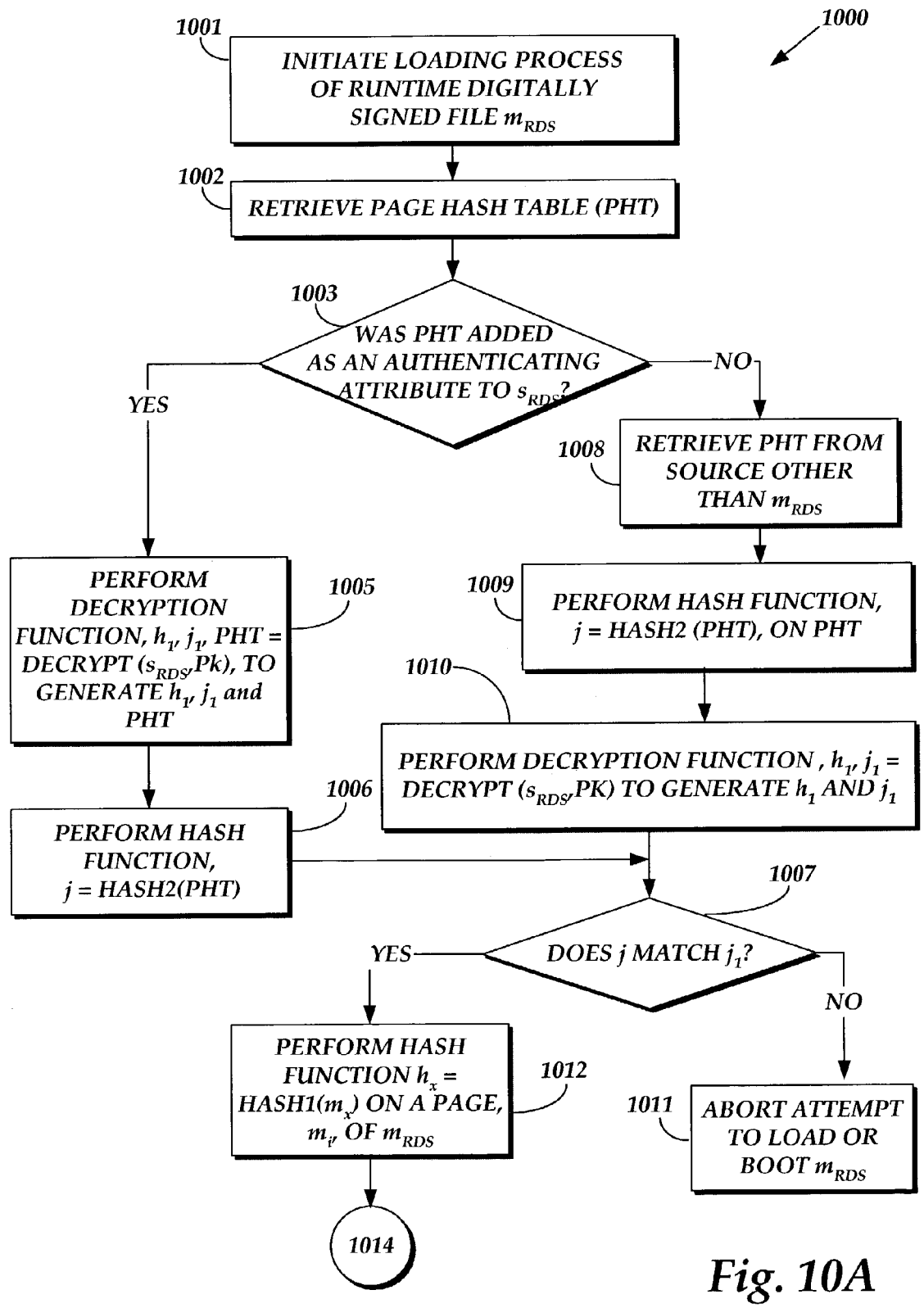
FIGS. 10A-10B represent a flow diagram showing exemplary steps in a method of incrementally verifying the authenticity of a runtime digitally signed file of the present invention by verifying each page as the page is loaded.
Figure 10B:
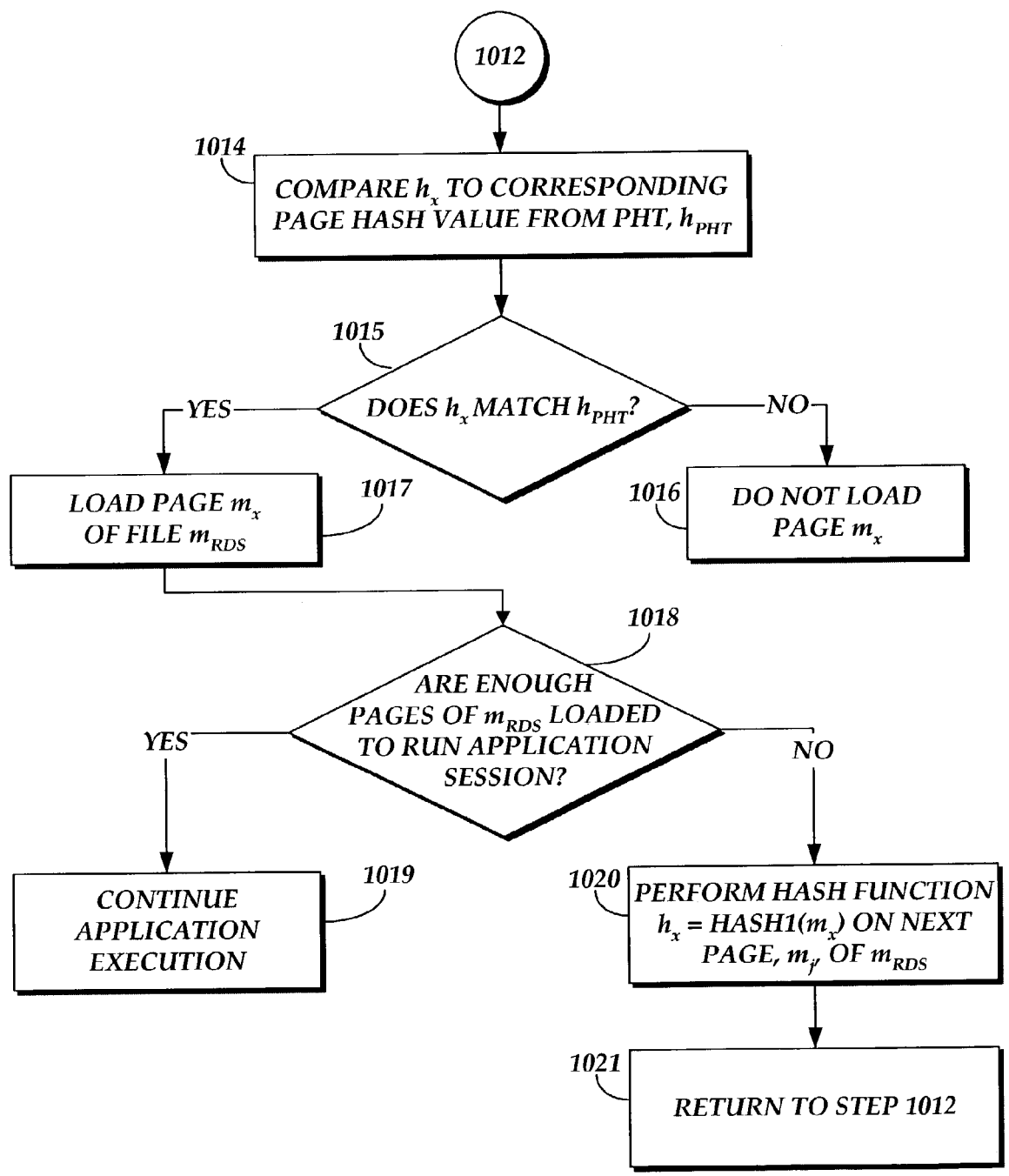

As shown in FIG. 10A, verification process 1000 begins with step 1001, wherein a user initiates a loading (or booting) process of runtime digitally signed file, $m_{RDS}$. Step 1001 proceeds to step 1002, wherein a page hash table associated with runtime digitally signed file $m_{RDS}$ is retrieved. At decision block 1003, a determination is made as to whether the page hash table was added as an authenticated attribute to runtime digital signature $s_{RDS}$. If the page hash table was added to runtime digital signature $s_{RDS}$ as an authenticated attribute, process 1000 proceeds to step 1005.

In step 1005, a decryption function is performed to generate decryption outputs $h_1$, $j_1$ and PHT. Once the page hash table (PHT) has been generated in step 1005, a hash function, $j=HASH2(PHT)$, is performed on the page hash table as shown in step 1006 of FIG. 10A. From step 1006, process 1000 proceeds to decision block 1007.

Returning to decision block 1003, if a determination is made that the page hash table was not added to the runtime digital signature $s_{RDS}$ as an authenticated attribute, process 1000 proceeds to step 1008, wherein the page hash table is retrieved from a source other than runtime digitally signed file $m_{RDS}$. Possible sources include, but are not limited to, a file created on initial install or first use of the file on the user's computer via the process depicted in FIG. 4, or a separate electronic file received from the software developer and/or distributor via the Internet, electronic mail or via other physical electronic media, such as a CD-ROM, DVD-ROM or floppy disk. From step 1008, process 1000 proceeds to step 1009, wherein hash function $j=HASH1(PHT)$ is performed on the page hash table to generate page hash table hash result j. From step 1009, process 1000 proceeds to step 1010, wherein a decryption function is used to generate decrypted file hash result $h_1$ and decrypted page hash table hash result $j_1$. From step 1010, process 1000 proceeds to decision block 1007.

At decision block 1007, a determination is made as to whether page hash table hash result j matches decrypted page hash table hash result $j_1$. If page hash table hash result j does not match decrypted page hash table hash result $j_1$, process 1000 proceeds to step 1011, wherein the attempt to load (or boot) runtime digitally signed file $m_{RDS}$ is aborted. If page hash table hash result j does match decrypted page hash table hash result $j_1$, process 1000 proceeds to step 1012, wherein hash function $h_x=HASH1(m_x)$ is performed on a page $m_i$ of runtime digitally signed file $m_{RDS}$. From step 1012, process 1000 proceeds to step 1014 shown in FIG. 10B.

In step 1014, page hash value $h_x$ associated with page $m_i$ is compared to a corresponding page hash value from the page hash table (referred to herein as $h_{PHT}$). At decision block 1015, a determination is made as to whether page hash value $h_x$ matches the corresponding page hash value, $h_{PHT}$, from the page hash table. If a determination is made that the page hash value $h_x$ does not match the corresponding page hash value $h_{PHT}$ in step 1015, process 1000 proceeds to step 1016, wherein the process prevents loading of page $m_x$ of runtime digitally signed file $m_{RDS}$. If in step 1015 a determination is made that page hash result $h_x$ does match the corresponding page hash value $h_{PHT}$ from the page hash table, process 1000 proceeds to step 1017, wherein page $m_x$ is loaded onto a user's computer.

Process 1000 proceeds from step 1017 to decision block 1018, wherein a determination is made whether enough pages of runtime digitally signed file $m_{RDS}$ have been loaded to complete a given application session. If at step 1018 a determination is made that enough pages of runtime digitally signature file $m_{RDS}$ have been loaded to complete a given application session, process 1000 proceeds to step 1019, wherein application execution may proceed. If at step 1018 a determination is made that further pages of runtime digitally signature file $m_{RDS}$ need to be loaded to complete a given application session, process 1000 proceeds to step 1020, wherein hash function $h_x=HASH1(m_x)$ is performed on another page, $m_j$, of runtime digitally signed file $m_{RDS}$. From step 1020, process 1000 proceeds to step 1021, which returns process 1000 to step 1012 to proceed as outlined above.

IV. Other Uses of A Runtime Digital Signature

The runtime digital signature (RDS) of the present invention may also be used for other purposes than those described above. In one embodiment of the present invention, the runtime digital signature is used to establishing the trustworthiness and integrity of data accessed over low bandwidth media (e.g. Local Area Networks, Wide Area Networks, the Internet, Floppy Drives, Tape Drives, etc.). In this case, the RDS and the PHT (included as an authenticated attribute or provided separately) are accessed before the data itself, enabling the trustworthiness of the data to be established. When the data is trusted and the data access proceeds, the page hashes in the PHT are used to verify successful transmission of the individual data blocks corresponding to those hashes.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of generating a runtime digital signature, wherein the method comprises:
    performing a first hash function on each page of a file to generate x first hash results, wherein x represents the number of pages of the file;
    forming a page hash table from the x first hash results;
    performing a second hash function on the page hash table to generate page hash table hash result j;
    performing a third hash function on the entire file contents of the file to generate file hash result h; and
    performing an encryption function on j and h.

2. A method of generating a runtime digitally signed file, said method comprising:
    performing a first hash function on each page of a file to generate x first hash results, wherein x represents the number of pages of the file;
    forming a page hash table from the x first hash results;
    performing a second hash function on the page hash table to generate page hash table hash result j;
    performing an encryption function on j to generate a runtime digital signature; and
    associating the runtime digital signature with a content of the file.

3. A method of generating a runtime digitally signed file, said method comprising:
performing a first hash function on each page of a file to generate x first hash results, wherein x represents the number of pages of the file;
forming a page hash table from the x first hash results;
performing a second hash function on the page hash table to generate page hash table hash result j;
performing a third hash function on the entire file contents of the file to generate file hash result h;
performing an encryption function on j and h to generate a runtime digital signature; and
associating the runtime digital signature with a content of the file.

4. A method of verifying the authenticity of a runtime digitally signed file, wherein the method comprises:
loading a page hash table associated with the runtime digitally signed file;
verifying the integrity of the page hash table;
loading at least one page of the runtime digitally signed file;
verifying the integrity of each page as each page is loaded, wherein verifying the integrity of each page as each page is loaded includes:
performing a page hash function on a first page of the file to generate a first page hash output;
comparing the first page hash output to a corresponding page hash output value from the page hash table;
when the first page hash output matches the corresponding page hash output value from the page hash table, the integrity of the first page is verified and the first page of the file is loaded;
performing a page hash function on a second page of the file to generate a second page hash output;
comparing the second page hash output to a corresponding page hash output value from the page hash table; and
when the second page hash output matches the corresponding page hash output value from the page hash table, the integrity of the second page is verified and the second page of the file is loaded.

5. The method of claim 4, further comprising:
loading only a number of pages necessary to complete an application session.

6. A computer readable medium having stored thereon computer-executable instructions for performing a method of generating a runtime digital signature, wherein the method comprises:
performing a first hash function on each page of a file to generate x first hash results, wherein x represents the number of pages of the file;
forming a page hash table from the x first hash results;
performing a second hash function on the page hash table to generate page hash table bash result j;
performing a third hash function on the entire file contents of the file to generate file hash result h; and
performing an encryption function on j and h.

7. A computer readable medium having stored thereon computer-executable instructions for performing a method of generating a runtime digitally signed file, said method comprising:
performing a first hash function on cach page of a file to generate x first hash results, wherein x represents the number of pages of the file;
forming a page hash table from the x first hash results;
performing second hash function on the page hash table to generate page hash table hash result j;
performing an encryption function on j to generate a runtime digital signature; and
associating the runtime digital signature with a content of the file.

8. A computer readable medium having stored thereon computer-executable instructions for performing a method of generating a runtime digitally signed file, said method comprising:
performing a first hash function on each page of a file to generate x first hash results, wherein x represents the number of pages of the file;
forming a page bash table from the x first hash results;
performing a second hash function on the page hash table to generate page hash table hash result j;
performing a third hash function on the entire file contents of the file to generate file hash result h;
performing an encryption function on j and h to generate a runtime digital signature; and
associating the runtime digital signature with a content of the file.

9. A computer readable medium having stored thereon computer-executable instructions for performing a method of verifying the authenticity of a runtime digitally signed file, wherein the method comprises:
loading a page hash table associated with the runtime digitally signed file;
verifying the integrity of the page hash table;
loading at least one page of the runtime digitally signed file;
verifying the integrity of each page as each page is loaded, wherein verifying the integrity of each page as each page is loaded includes:
performing a page hash function on a first page of the file to generate a first page hash output;
comparing the first page hash output to a corresponding page hash output value from the page hash table;
when the first page hash output matches the corresponding page hash output value from the page hash table, the integrity of the first page is verified and the first page of the file is loaded;
performing a page hash function on a second page of the file to generate a second page hash output;
comparing the second page hash output to a corresponding page hash output value from the page hash table; and
when the second page hash output matches the corresponding page hash output value from the page hash table, the integrity of the second page is verified and the second page of the file is loaded.

10. The computer readable medium of claim 9 further comprising:
loading only a number of pages necessary to complete an application session.

11. A computing system containing at least one application module usable on the computing system, wherein at least one application module comprises application code for performing a method of generating a runtime digital signature, wherein the method comprises:
performing a first hash function on each page of a file to generate x first hash results, wherein x represents the number of pages of the file;
forming a page hash table from the x first hash results;
performing a second hash function on the page hash table to generate page hash table hash result j;
performing a third hash function on the entire file contents of the file to generate file hash result h; and
performing an encryption function on j and h.

12. A computing system containing at least one application module usable on the computing system, wherein at least one application module comprises application code for performing a method of generating a runtime digitally signed file, said method comprising:
- performing a first hash function on each page of a file to generate x first hash results, wherein x represents the number of pages of the file;
- forming a page hash table from the x first hash results;
- performing a second hash function on the page hash table to generate page hash table hash result j;
- performing an encryption function on j to generate a runtime digital signature; and
- associating the runtime digital signature with a content of the file.

13. A computing system containing at least one application module usable on the computing system, wherein at least not one application module comprises application code for performing a method of generating a runtime digitally signed file, said method comprising:
- performing a first hash function on each page of a file to generate x first hash results, wherein x represents the number of pages of the file;
- forming a page hash table from the x first hash results;
- performing a second hash function on the page hash table to generate page hash table hash result j;
- performing a third hash function on the entire file contents of the file to generate file hash result h;
- performing an encryption function on j and h to generate a runtime digital signature; and
- associating the runtime digital signature with a content of the file.

14. A computing system containing at least one application module usable on the computing system, wherein at least one application module comprises application code for performing a method of verifying the authenticity of a runtime digitally signed file, wherein the method comprises:
- loading a page hash table associated with the runtime digitally signed file;
- verifying the integrity of the page hash table;
- loading at least one page of the runtime digitally signed file;
- verifying the integrity of each page as each page is loaded, wherein verifying the integrity of each page as each page is loaded includes;
  - performing a page hash function on a first page of the file to generate a first page hash output;
  - comparing the first page hash output to a corresponding page hash output value from the page hash table;
  - when the first page hash output matches the corresponding page hash output value from the page hash table, the integrity of the first page is verified and the first page of the file is loaded;
  - performing a page hash function on a second page of the file to generate a second page hash output;
  - comparing the second page hash output to a corresponding page hash output value from the page hash table; and
  - when the second page hash output matches the corresponding page hash output value from the page hash table, the integrity of the second page is verified and the second page of the file is loaded.

15. The computing system of claim 14, further comprising:
- loading only a number of pages necessary to complete an application session.

* * * * *